United States Patent
Wolf et al.

(10) Patent No.: US 6,456,923 B1
(45) Date of Patent: Sep. 24, 2002

(54) METHOD FOR DETECTING CORNERING FOR A VEHICLE WITH AN AUTOMATIC TRANSMISSION

(75) Inventors: Andreas Wolf, Ravensburg; Matthias Winkel, Weingarten; Christoph Rüchardt, Wangen i. Allgäu; Bertram Wengert, Markdorf; Jürgen Müller, Friedrichshafen, all of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/786,216

(22) PCT Filed: Aug. 28, 1999

(86) PCT No.: PCT/GB99/06853

§ 371 (c)(1),
(2), (4) Date: Mar. 1, 2001

(87) PCT Pub. No.: WO00/14433

PCT Pub. Date: Jun. 16, 2000

(30) Foreign Application Priority Data

Sep. 2, 1998 (DE) .......................... 198 39 858

(51) Int. Cl.[7] .............................. B60T 8/24; G06F 7/00
(52) U.S. Cl. ........................ 701/72; 180/41; 280/5.508
(58) Field of Search ................... 701/72, 74; 180/197, 180/41; 280/5.508

(56) References Cited

U.S. PATENT DOCUMENTS

| 4,844,557 | A | | 7/1989 | Giers | 303/111 |
|---|---|---|---|---|---|
| 4,921,060 | A | * | 5/1990 | Imaseki et al. | 180/41 |
| 5,005,131 | A | * | 4/1991 | Imaseki et al. | 180/197 |
| 5,102,202 | A | | 4/1992 | Breen | 303/7 |
| 5,494,344 | A | | 2/1996 | Heyn et al. | 303/140 |
| 5,828,975 | A | * | 10/1998 | Isshiki et al. | 340/444 |
| 6,044,320 | A | * | 3/2000 | Stuible et al. | 180/197 |
| 6,052,643 | A | * | 4/2000 | Batistic | 303/163 |

FOREIGN PATENT DOCUMENTS

| DE | 37 31 077 A1 | 3/1989 |
|---|---|---|
| DE | 39 10 945 A1 | 10/1990 |
| DE | 40 29 426 A1 | 4/1991 |
| DE | 42 05 979 A1 | 9/1993 |
| DE | 42 30 481 A1 | 3/1994 |
| DE | 195 23 804 A1 | 1/1997 |
| DE | 196 18 805 A1 | 11/1997 |
| DE | 196 38 280 A1 | 3/1998 |
| WO | 89/04782 | 6/1989 |

* cited by examiner

Primary Examiner—Jacques H. Louis-Jacques

(57) ABSTRACT

The invention relates to a method for detecting cornering for a vehicle (2) with automatic transmission. According to the invention it is proposed that the current bend radius be determined from the rotational speed signals of the front wheels, that the beginning of a cornering mode be determined when the current bend radius falls below a first limit bend radius and the end of a cornering mode be determined when the vehicle has covered a presettable distance after exceeding a second limit bend radius.

9 Claims, 2 Drawing Sheets

METHOD FOR DETECTING CORNERING FOR A VEHICLE WITH AN AUTOMATIC TRANSMISSION

FIELD OF THE INVENTION

The invention relates to a method for detecting cornering, specially for a vehicle having an automatic transmission, in which the rotational speed signals are taken up on the wheels of the vehicle and a control device cyclically determines a current bend radius.

BACKGROUND OF THE INVENTION

Such methods are used in already known transmission controls, for example, to detect, depending on the actual transverse acceleration of the vehicle, a "cornering" mode and to stifle gear shifts. DE 196 18 805 A1 has disclosed a method for evaluating a cornering in an automatic transmission in which rotational speeds measured by a measuring device on the wheels of the vehicle are used to calculate a transverse acceleration of the vehicle.

In long vehicles such as semi-trailers the known methods are not well suited to determine the beginning of a curve and the end of a curve. A tractor, for example, can already drive straight ahead again while the semi-trailer is still in a curve.

Therefore, this invention is based on the problem of providing a simple reliable method for long vehicles a quick detection of "cornering".

SUMMARY OF THE INVENTION

According to the invention the beginning of a cornering mode is determined when the bend radius calculated form the rotational speed signals of the front wheels falls below a first limit radius. The rotational speeds of the front wheels are used in order to detect as early as possible a cornering mode. After exceeding a second limit radius, the end of the cornering mode is only determined when a certain distance related to the length of the vehicle is covered while the first limit radius is no longer fallen below. Therefore, in the example of the semi-trailer, the end of the cornering mode is not detected when the tractor again moves straight ahead but only after a certain distance has been covered while the semi-trailer still moves around the curve.

The second limit radius is advantageously larger by a presettable amount than the first limit radius. This radius hysteresis prevents a reciprocal jumping between the modes "cornering" and "straight ahead driving".

In an advantageous development of the inventive method the limit radii depend on the vehicle speed stored in the transmission control, the limit values at low speeds of the vehicle being smaller than at high speeds of the vehicle. Hereby is prevented that numerical inaccuracies, the consequences of which are great at low speeds of the vehicle, result in that a cornering mode be erroneously determined.

The consequences of individual inaccurate measurements can be reduced by upwardly limiting by a maximum admissible change the change of the calculated bend radius between two consecutive scanning steps.

The signal of he calculated bend radius can be advantageously stabilized by a PT1 filter element.

Wheel slip on individual wheels could lead to malinterpretations of the bend radius for which reason it is advantageous not to determine a cornering mode when a wheel slip prevention system such as ABS or ASR is active. It is also advantageous to preset a minimum speed below which a cornering is not determined in order to prevent malinterpretations due to numerical inaccuracies.

The inventive method and developments thereof can advantageously be used to control an automatic transmission wherein the triggering from upshifts to downshifts during cornering is influenced. Undesired upshifts and downshifts can thus be prevented when cornering.

The method can also be advantageously used within an algorithm for tractional resistance calculation of the vehicle in order to take into account the tractional resistance increased during cornering. The tractional resistance calculation can be initialized again after the end of the curve.

BRIEF DESCRIPTION OF THE DRAWINGS

The inventive method is explained in detail with reference to the enclosed drawings wherein.

DESCRIPTION OF THE PREFERRED EMBODIMENTS

Figure 1:
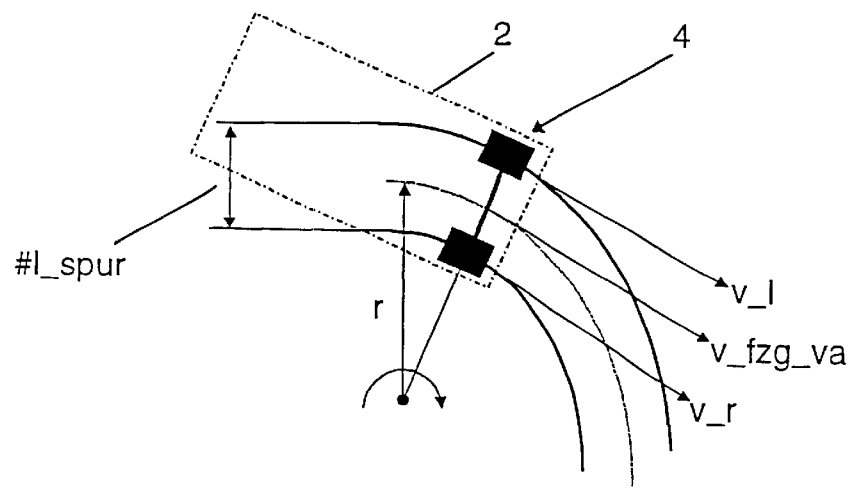
FIG. 1 is a diagrammatic illustration of a vehicle when cornering.
Figure 2:
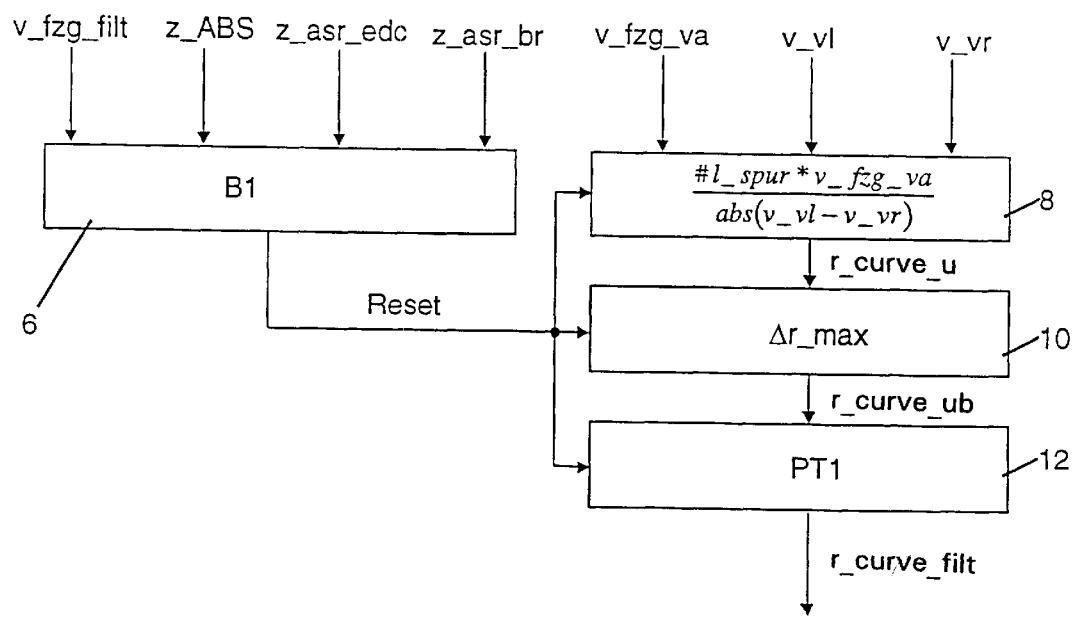
FIG. 2 is a block diagram of an algorithm for calculating the bend radius.
Figure 3:
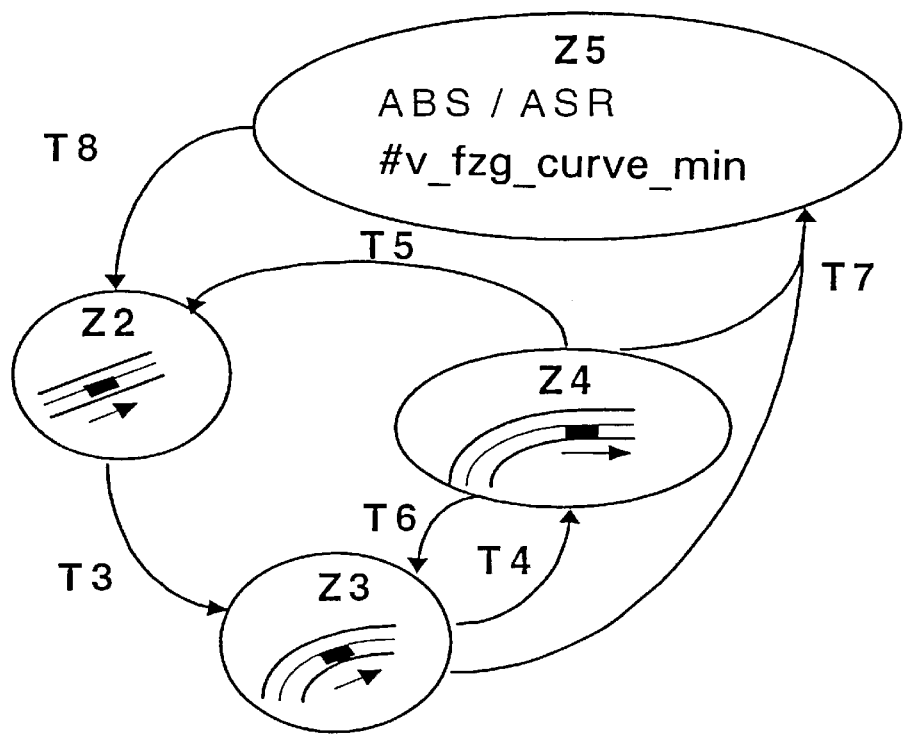
FIG. 3 is a mode automat of the inventive method.

In FIG. 1 the diagrammatically sketched vehicle 2 with its front axle 4 is at the beginning of a curve with bend radius r. The vehicle has the track width #1_spur. With v_ and v_r are respectively designated the speeds of the left and right front wheels. The vehicle speed is designated with v_fzg_va. From said variables a bend radius can be determined according to the following equation:

$$r\_curve\_u = \frac{\#1\_spur * v\_fzg\_va}{abs(v\_1 - \overline{v}r)}$$

wherein:

r_curve_u bend radius v_fzg_va vehicle speed v_v1 speed, left front wheel v_vr speed, right front wheel The calculation of the radius is explained in detail with reference to the block diagram of FIG. 2. In the block B1 the algorithm is controlled according to the vehicle speed v_fzg_filt and ABS or ASR mode variable z_ABS, z_asr_edc, z_asr_br. The radius is calculated only when the ABS or ASR mode variables indicate that these systems are not active. Errors caused by wheel slip are prevented in this manner. The radius is calculated, besides, only when the vehicle speed v_fzg_filt is higher than a presettable minimum vehicle speed, since numeric differences determined by the system have a specially strong effect at low speeds. In the block designated with 8 a bend radius r_curve_u is calculated cyclically according to the above mentioned formula. In block 10 is formed the difference between the value for r_curve_u of this calculation cycle and the value r_curve_ub of the last calculation cycle. When this difference is greater than a maximum admissible change, the new value for r_curve_ub is calculated form the sum of the last value for r_curve_ub and the value for the maximum admissible change. Otherwise r_curve_ub=r_curve_u is set. This step limits the consequences of individual implausible wrong measurements.

The quality of the calculated current bend radius v_fzg_filt is finally improved by front-mounting in block 12 a PT1 retardation element. The current bend radius v_fzg_filt is cyclically determined, as explained above. The current bend radius v_fzg_filt is compared with a first limit bend radius #r_curve_min. When falling below said limit bend radius, the beginning of a cornering mode is determined. At the same time the transition T3 is shifted so that now the mode Z3 is active during which is determined a cornering. In the mode Z3 the current bend radius v_fzg_filt is compared with a second limit bend radius which corresponds to the sum of the first limit bend radius and a presettable hysteresis value. The transition T4 is shifted when said second limit bend radius is exceeded so that now the mode Z4 is active. In this mode the front wheels of the vehicle, for ex., already are again in straight ahead drive position while the rear part of the vehicle (semi-trailer) is still in the curve. When entering in the mode Z4 the measuring of a distance covered by the vehicle is started. When the value of the covered distance reaches a presettable limit value, the transition T5 shifts with which the mode Z4 converts to the mode Z2 (straight ahead drive).

If while the mode Z4 is active the current bend radius v_fzg_filt falls below the first limit bend radius, the transition T6 shifts whereby the mode Z3 is again converted to.

Departing from the mode Z3 (cornering) or from the mode Z4, the mode Z5 is reached via the transition T7 when a wheel slip detection system (ABS, ASR) is active or when the vehicle has fallen below a presettable minimum speed #v_fzg_curve_min. In the mode Z5 the radius calculation is reset. Only when none of the conditions for Z5 is any more present will there be shifted via the transition T8 again to the mode Z2 (straight ahead drive).

Figure 4:
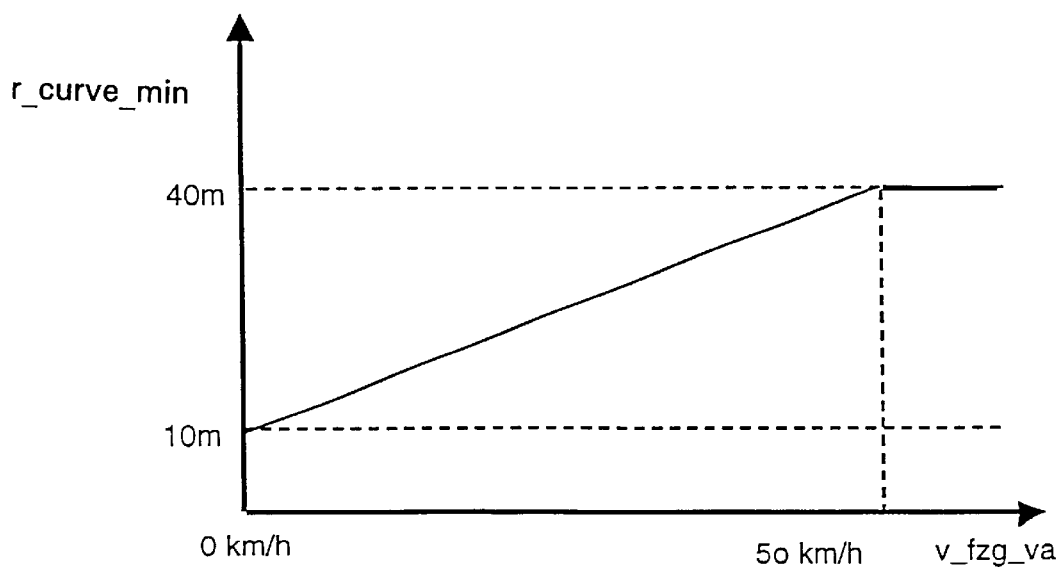
FIG. 4 is a diagram with the dependence of a curve limit radius on the speed.

FIG. 4 finally shows a characteristic line for the first curve limit radius #r_curve_min, which is stored in the control according to the vehicle speed v_fzg_va. The values for #r_curve_min are at low vehicle speeds smaller than at high vehicle speeds. Hereby is prevented that numeric errors, which have specially strong effects at low vehicle speeds, lead erroneously to determine the mode "cornering".

REFERENCE NUMERALS

2 vehicle
4 front axle
6 block B1 (control of the algorithm)
8 block (calculation of r_curve_u)
10 block (calculation of r_curve_ub)
12 block (Calculation of he current bend radius v_fzg_filt)
Z2 mode straight ahead drive
Z3 mode cornering
Z4 transition mode
Z5 mode ABS/ASR active or too low vehicle speed
T3 transition
T4 transition
T5 transition
T6 transition
T7 transition
T8 transition

What is claimed is:

1. A method for detecting cornering, specially in a vehicle (2) with automatic transmission, comprising the steps of providing rotational speed signals on front wheels (4) of the vehicle, and determining cyclically, by use of a control device, from the rotational speed signals of the front wheels a current bend radius; comparing that the current bend radius with a first limit bend radius and if the current bend radius is less than determining that the first limit bend radius, a cornering mode has begun; comparing the current bend radius with a second limit bend radius and if the current bend radius exceeds a second limit bend radius determining by use of the control device, a distance covered by the vehicle; comparing said distance covered by the vehicle with a presettable distance, and determining there no longer any cornering when the current limit bend radius does not again become less than the first limit bend radius while the presettable distance is covered.

2. The method according to claim 1, comprising setting the second limit bend radius to be larger by a presettable hysteresis amount than the first limit bend radius.

3. The method according to claim 1, comprising varying the first or the second limit bend radii stored in the control device according to the vehicle speed, the limit values being smaller at low vehicle speeds than at high vehicle speeds.

4. The method according to claim 1, comprising limiting an upwardly maximum admissible change of the calculated bend radius between two consecutive scanning cycles is in order to reduce the consequences of individual inaccurate measurements.

5. The method according to claim 4, comprising stabilizing the calculated bend radius by the use of a PT1 filter element.

6. The method according to claim 1, comprising not determining a cornering mode when a wheel slip prevention system (ABS, ASR) is active.

7. The method according to claim 1, comprising not determining a cornering mode when the vehicle speed is lower than a minimum speed.

8. The method according to claim 1 comprising controlling an automatic transmission wherein the triggering from upshifts to downshifts is influenced during cornering.

9. The method according to claim 1 comprising calculating an algorithm for tractional resistance in order to take into account increased tractional resistance when cornering.

* * * * *